United States Patent
Mendler, III

(10) Patent No.: US 10,316,737 B2
(45) Date of Patent: Jun. 11, 2019

(54) SUPERCHARGER COOLING MEANS

(71) Applicant: Edward Charles Mendler, III, Mill Valley, CA (US)

(72) Inventor: Edward Charles Mendler, III, Mill Valley, CA (US)

(*) Notice: Subject to any disclaimer, the term of this patent is extended or adjusted under 35 U.S.C. 154(b) by 259 days.

(21) Appl. No.: 15/330,526

(22) PCT Filed: Apr. 10, 2015

(86) PCT No.: PCT/US2015/000044
§ 371 (c)(1),
(2) Date: Sep. 29, 2016

(87) PCT Pub. No.: WO2015/167619
PCT Pub. Date: May 11, 2015

(65) Prior Publication Data
US 2017/0241327 A1    Aug. 24, 2017

Related U.S. Application Data

(60) Provisional application No. 61/996,151, filed on Apr. 30, 2014.

(51) Int. Cl.
*F02B 29/04*    (2006.01)
*F02B 33/38*    (2006.01)
*F02B 39/16*    (2006.01)

(52) U.S. Cl.
CPC .......... *F02B 33/38* (2013.01); *F02B 29/0475* (2013.01); *F02B 39/16* (2013.01);
(Continued)

(58) Field of Classification Search
CPC ............ F02B 2039/164; F02B 29/0475; F02B 33/38; F04C 29/04; F04C 15/0096
See application file for complete search history.

(56) References Cited

U.S. PATENT DOCUMENTS 2,489,887 A * 11/1949 Houghton ............. F04C 29/042
418/180
4,768,934 A    9/1988 Soeters
(Continued)

OTHER PUBLICATIONS

Welabrecht, John E.; The High-Ratio Circulating Compressor, International Compressor Engineering Conference, 1988, pp. 346-353, Purdue University, West Lafayette, IN, US.

*Primary Examiner* — Mary Davis

(57) ABSTRACT

According to the present invention, a rotary blower or supercharger includes a recirculation loop for readmitting pressurized outlet gas back into the rotor chambers, and cooling means for cooling the pressurized outlet gas before it is readmitted into the rotor chambers, thereby providing a supercharger having a lower operating temperature and a higher operating pressure capability. In the preferred embodiment of the present invention, a supercharger includes a housing assembly defining first and second transversely overlapping cylindrical chambers. The housing defines an inlet port for the inflow of an inlet gas, and an outlet port for the outflow of the outlet gas. The supercharger further has first and second meshed, lobed rotors respectively disposed in the chambers for counter rotation about axes substantially coincident with the chamber axes. According to the present invention, the housing further includes a recirculation port and a recirculation flow path for recirculation of a portion of outlet gas flowing out of the outlet port back into cylindrical chamber. The recirculation flow path further including cooling means for cooling of at least a portion of the outlet gas, thereby providing a cooler operating supercharger.

5 Claims, 8 Drawing Sheets

(52) U.S. Cl.
CPC ..... *F01P 2060/02* (2013.01); *F02B 2039/164* (2013.01); *Y02T 10/146* (2013.01)

(56) References Cited

U.S. PATENT DOCUMENTS

| | | | |
|---|---|---|---|
| 4,859,158 A * | 8/1989 | Weinbrecht | F04C 29/042 418/9 |
| 5,078,583 A | 1/1992 | Hampton | |
| 5,439,358 A * | 8/1995 | Weinbrecht | F04C 29/042 418/15 |
| 9,683,521 B2 * | 6/2017 | Mahalatkar | F02B 29/0406 |
| 2011/0058974 A1 | 3/2011 | Swartzlander | |
| 2014/0193285 A1 | 7/2014 | Swartzlander | |

* cited by examiner

SUPERCHARGER COOLING MEANS

This application relates to Provisional Application No. 61/996,151 having a filing date of Apr. 30, 2014. The present invention was made during performance of work under United States Department of Energy contract number DE-EE0005981.

BACKGROUND OF THE INVENTION

This invention relates to cooling means for Roots-type superchargers or rotary blowers. More specifically, the present invention relates to means for cooling the supercharger to enable the supercharger to produce higher boost pressures. The present invention may be employed as a supercharger for internal combustion engines and for other purposes such as an air or gas compressor.

A major strategy being employed for improving automobile fuel economy is engine downsizing, or reducing the displacement and number of cylinders of the engine. Supercharging enables a small displacement engines to achieve the same power output as a larger displacement naturally aspirated engine. The degree of engine downsizing that can be attained with supercharging, and therefore the degree of fuel economy improvement, depends on the boost pressure that the supercharger can deliver. The boost pressure that a supercharger can deliver is currently limited by overheating of the supercharger. Supercharger cooling means are needed for increasing supercharger boost pressure and improving automobile fuel economy through engine downsizing.

Roots-type superchargers are shown in U.S. Pat. Nos. 4,768,934 and 5,078,583, and United States Patent Application Pub. Nos. US2011/0058974 A1 and US2014/0193285 A1. These superchargers use helical rotors for improved efficiency and reduced noise.

Referring now to U.S. Pat. No. 4,768,935, Raymond Soeters shows in FIGS. 4 and 5 backflow slots (40) and (42) for reducing supercharger noise by permitting back flow of pressurized air from the supercharger outlet port (38) directly into the back flow slots (40) and (42) and into the cylindrical chambers (32) and (34). The backflow slots reduce noise but have no reported cooling benefits.

Referring now to U.S. Pat. No. 5,078,583, Keith Hampton shows similar back flow slots (44) and (46) in FIG. 2. In FIG. 4 it can be seen that outlet port opening (26) and back flow slots (44) and (46) are directly joined through a common manifold or recess (42), as described in column 4 lines 37 through 56. The backflow air is generally hot because it has been compressed and because of its turbulent recirculation flow path. The backflow slots reduce noise but have no reported cooling benefits.

US Patent Application Publication Nos. US2011/0058974 A1 and US2014/0193285 A1 show helical rotors that provide for improve flow aerodynamics and improved supercharger efficiency. Referring to FIG. 7 in both of these publications, these superchargers have a blow hole or back flow port (51) that provides for internal backflow of compressed air, with external back flow slots no longer shown. It is the intent of the blow hole to minimize supercharger noise by allowing the low pressure intake air between rotor lobes and the housing to increase in pressure or more closely equalize with the outlet air pressure prior to the transition volume opening to the outlet port (19). The backflow air is generally hot because it has been compressed and because of its turbulent recirculation flow path through the blow hole. The blow hole reportedly reduces noise but does not provide cooling benefits.

A problem with prior art superchargers is that their working pressure or pressure ratio capability is limited by overheating. The working pressure can be increased by using large clearances between the rotors and housings to accommodate thermal expansion, but the large clearances result in increased leakage and lower supercharger efficiency.

SUMMARY OF THE INVENTION

According to the present invention, a rotary blower or supercharger includes a recirculation loop for readmitting pressurized outlet gas back into the rotor chambers, and cooling means for cooling the pressurized outlet gas before it is readmitted into the rotor chambers, thereby providing a supercharger having a lower operating temperature and a higher operating pressure capability.

In the preferred embodiment of the present invention, a supercharger includes a housing assembly defining first and second transversely overlapping cylindrical chambers. The housing defines an inlet port for the inflow of an inlet gas, and an outlet port for the outflow of the outlet gas. The supercharger further has first and second meshed, lobed rotors respectively disposed in the chambers for counter rotation about axes substantially coincident with the chamber axes. According to the present invention, the housing further includes a recirculation port and a recirculation flow path for recirculation of a portion of outlet gas flowing out of the outlet port back into cylindrical chamber. The recirculation flow path further including cooling means for cooling of at least a portion of the outlet gas, thereby providing a cooler operating supercharger.

The recirculation port is located for preventing back flow from the supercharger outlet to the supercharger inlet. In more detail, the contained volume between two adjacent rotor lobes and the supercharger housing defines a transfer volume. To prevent backflow, the transfer volume is functionally not open to the supercharger outlet and supercharger inlet at the same time.

Another objective of the present invention is to maintain a high flow capacity for the supercharger, which is generally achieved by maximizing the size of the inlet port. To achieve the dual objectives of preventing back flow and maximizing flow capacity by maximizing inlet port size, the recirculation port opening has a small arc length in an embodiment of the present invention. To maximize recirculation flow capacity, the recirculation port also has a large cross sectional area according to the present invention. In more detail, the recirculation port preferably has a port cord length to arc length ratio of at least 7:1 and preferably greater than 9:1 for achieving a large port cross section area over a short arc length, thereby maximizing recirculation port cross sectional area with minimum reduction in inlet port cross sectional area. Additional embodiments of the present invention for achieving supercharger cooling, prevention of back flow and a high flow capacity are described in the Detailed Description of the Preferred Embodiments.

Another objective of the present invention is to minimize the marginal cost increase for the supercharger and cooling means of the present invention, and to provide close-coupled cooling of the recirculation gas. An advantage of close-coupled cooling or intercooling is that boost pressure can be provided with minimal lag time. A short lag time is important for downsized internal combustion engines providing a similar responsiveness to that of larger naturally aspirated engines. According to an embodiment of the present invention having a close-coupled intercooler, the recirculation port is located in the intercoolers outlet plenum. According to an embodiment of the present invention, the intercooler outlet plenum and rotor cylindrical chamber share a cast wall, and the recirculation port generally comprises a low-cost hole through the shared wall. The embodiment of the present invention provides significant cooling benefits at no or almost no increase in supercharger cost relative to current production supercharger having close-coupled intercoolers but not the cooling technology of the present invention. Additional embodiments of the present invention for achieving supercharger cooling and a low marginal cost are described in the Detailed Description of the Preferred Embodiments.

The primary objective of the present invention is to provide a cooler running supercharger so that higher outlet pressures can be generated without over heating the supercharger. A second objective is to increase supercharger efficiency through improved cooling, tighter operating clearances and lessen leakage. Tighter operating clearances can be attained by cooling the supercharger and reducing thermal expansion of the rotors and supercharger housing assembly. A third objective is to provide a high-flow capacity supercharger, and in more detail to provide cooling means according to the present invention without substantively reducing the flow and output capacity of the supercharger. A fourth objective is to provide close-coupled intercooling of the supercharger to provide a fast response and a low marginal cost increase for the present invention.

DETAILED DESCRIPTION OF THE PREFERRED EMBODIMENTS

Figure 1:
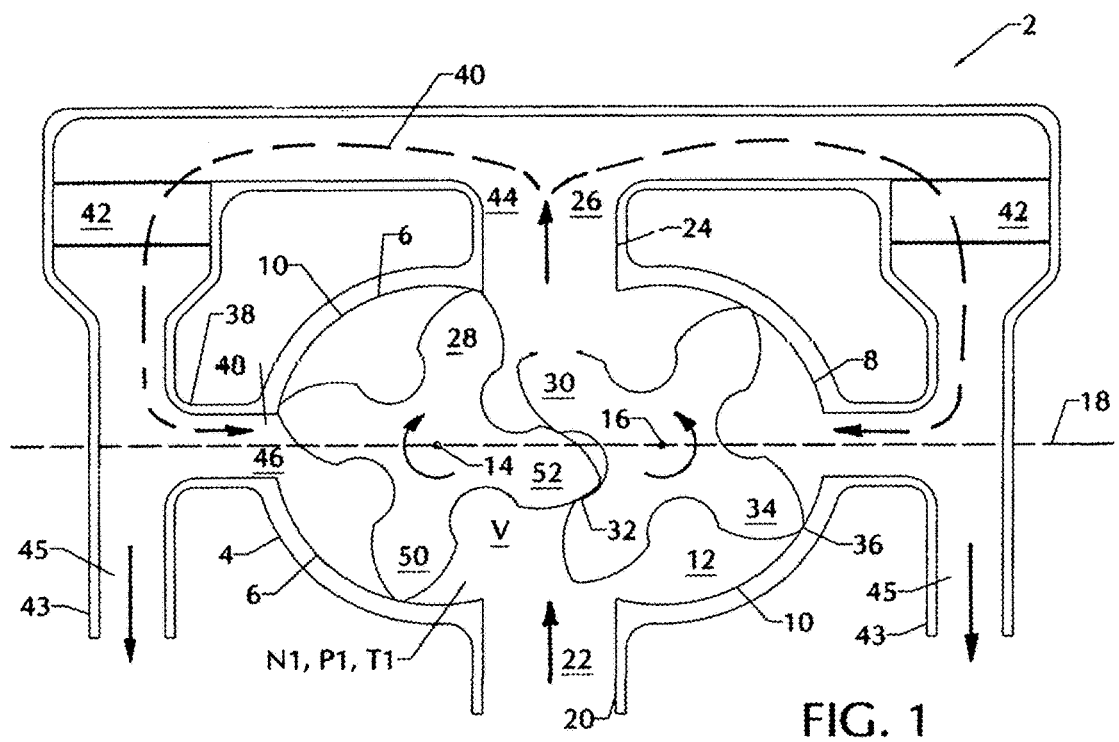
FIG. 1 is intended to schematically illustrate a rotary blower or supercharger having the cooling means of the present invention.
Figure 2:
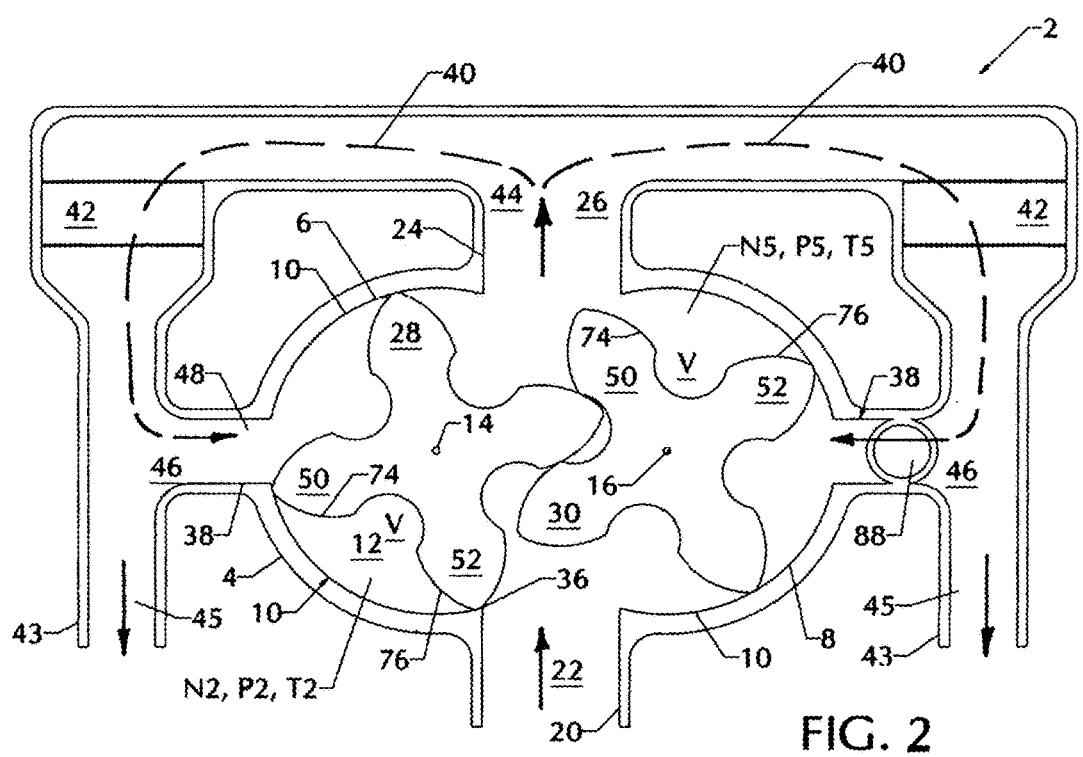
FIG. 2 is similar to FIG. 1 but shows the supercharger rotors at a different rotational position.
Figure 3:
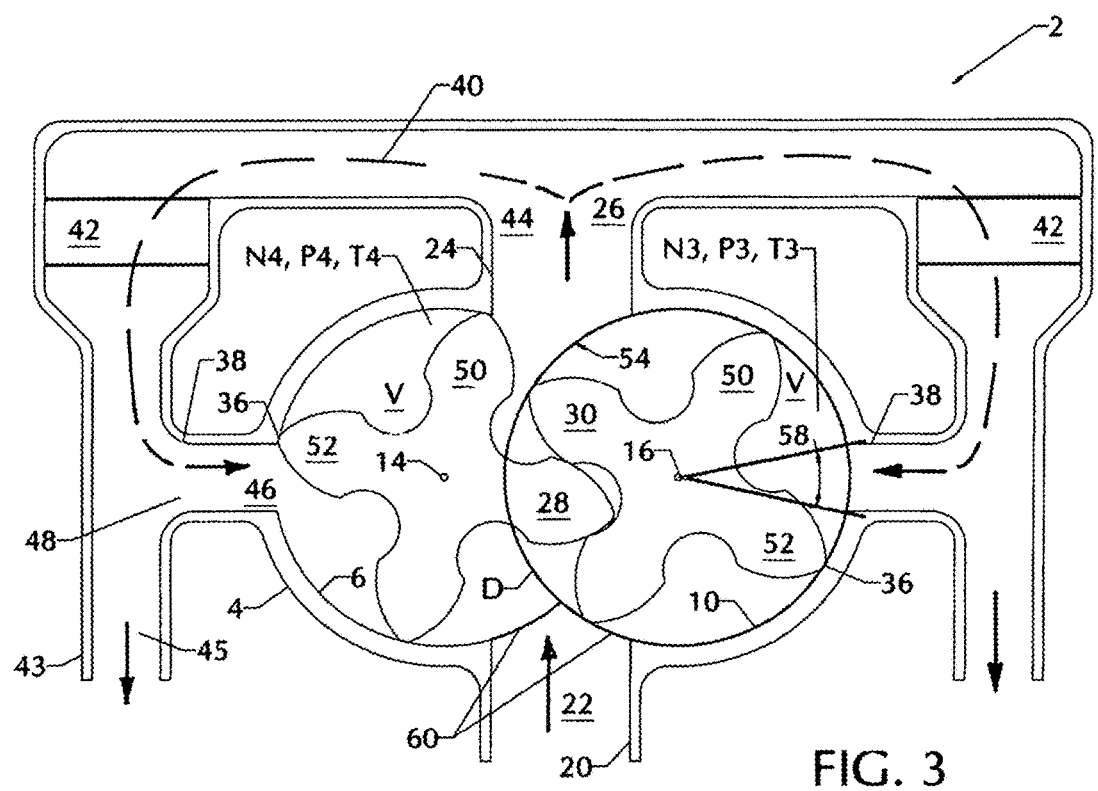
FIG. 3 is similar to FIG. 1 but shows the supercharger rotors at a different rotational position.
Figure 4:
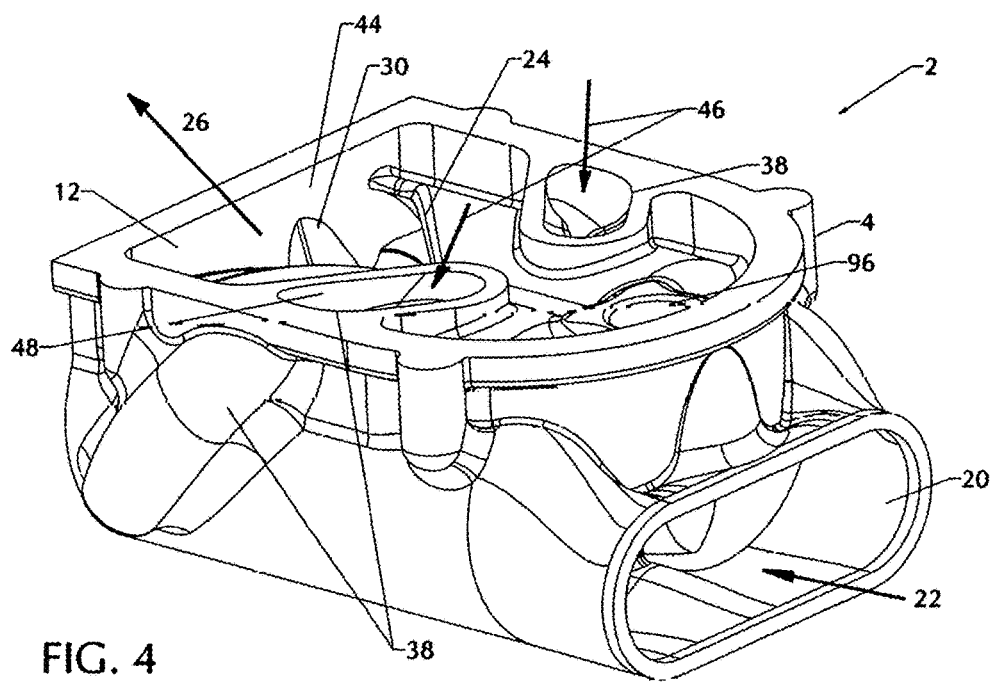
FIG. 4 is a perspective view of a portion of the supercharger having recirculation ducts according to the present invention.
Figure 5:
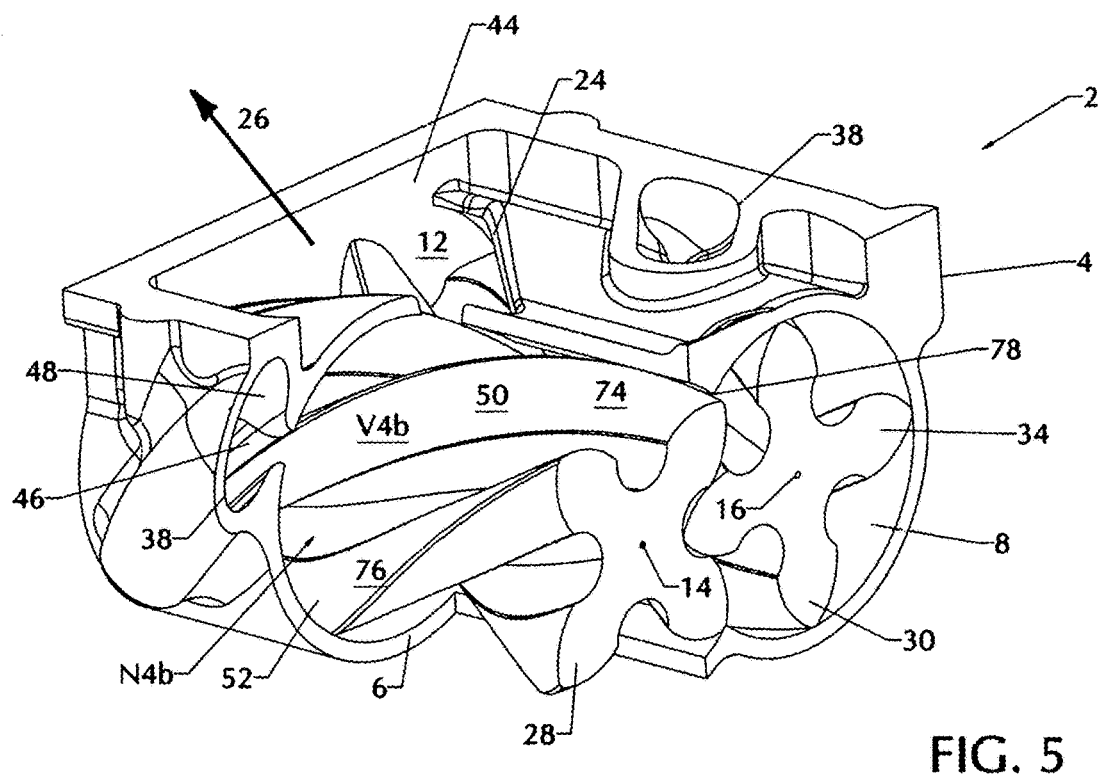
FIG. 5 is similar to FIG. 4 but shows a cut away view to better show the recirculation duct.

FIGS. 1, 2, 3, 4, 5 and 11 are intended to illustrate a rotary blower or supercharger 2 with cooling means 42 according to the present invention. FIGS. 1, 2 and 3 are similar but show the supercharger lobed rotors 28 and 30 at different rotational positions. FIG. 4 shows a perspective view of a portion of the supercharger according to the present invention. FIG. 5 is similar to FIG. 4, but shows a partial cutaway view to better show the cool air recirculation port 38 according to the present invention.

Rotary blower or supercharger 2 includes a housing assembly 4 defining first 6 and second 8 transversely overlapping cylindrical chambers having internal cylindrical wall surfaces 10 and end wall surfaces 12. Chamber 6 has a first central axis 14, and chamber 8 has a second central axis 16. First central axis 14 and second central axis 16 are spaced apart and parallel, and lie in a common plane 18. The housing 4 defines an inlet port 20 for the inflow of an inlet gas 22, and also defines an outlet port 24 for the outflow of an outlet gas 26. Inlet port 20 may optionally include a throttle 94.

First 28 and second 30 lobed rotors are in mesh or meshed for counter rotation relative to one another. Timing gears (not shown) are used for synchronous counter rotation of the lobed rotors according to current production practices. A drive pulley 92 may optionally be used to drive supercharger 2. Lobed rotors 28 and 30 are disposed in the chambers 6 and 8 for counter rotation about axes substantially coincident with the chamber axes 14 and 16. The first 28 and second 30 meshed lobed rotors are rotatably mounted for rotation through rotational positions.

The first 28 and second 30 meshed lobed rotors have a sealing mesh fit 32 for generally limiting leakage or flow of gas between the rotors (shown in FIG. 1). Each lobed rotor 28 and 30 has axially facing ends 34 sealingly cooperating with the end wall surfaces 12 of housing 4. Each rotor lobe 28 and 30 has a plurality of radially outer tips 36 sealingly cooperating with the cylindrical wall surfaces 10.

According to the preferred embodiment of present invention, housing 4 further includes a recirculation port 38 and a recirculation flow path 40 for recirculation of a portion of outlet gas 26 flowing out of the outlet port 24 back into cylindrical chamber 6, and recirculation flow path 40 further includes cooling means 42 for cooling of at least a portion of outlet gas 26, thereby providing a cooler operating temperature of rotary blower or supercharger 2.

The outlet port 24 has an outlet temperature 44, and the recirculation port 38 has a cooled recirculation gas 46 that has a recirculation temperature 48. Preferably the cooling means 42 is an intercooler or aftercooler, and cooling means 42 provides cooling of flow path 40 for providing a lower recirculation temperature 48 of cooled recirculation gas 46 than outlet temperature 44 of outlet gas 26, thereby providing a cooler operating temperature of supercharger 2.

The supercharger 2 further has a leading rotor lobe 50 and an adjacent trailing rotor lobe 52, and a transition volume V located between leading rotor lobe 50 and adjacent trailing lobe 52. Transition volume V has a first position N1. Transition volume V is in fluid communication with inlet port 20 in first position N1, and transition volume V has a first pressure P1 and a first temperature T1 at first position N1.

Transition volume V has a second position N2 located at the moment the trailing lobe 52 has rotated out of fluid communication with inlet port 20. Transition volume V has a second pressure P2 and a second temperature T2 at second position N2.

Transition volume V has a third position N3. Transition volume V is in fluid communication with recirculation port 38 and generally out of fluid communication with outlet port 24 in third position N3 after transition volume V comes out of fluid communication with inlet port 20. Transition volume V has a third pressure P3 and a third temperature T3 at third position N3, Transition volume V has a fourth position N4 located at the moment the trailing lobe 52 has rotated out of fluid communication with recirculation port 38. Transition volume V having a fourth pressure P4 and a fourth temperature T4 at fourth position N4.

Transition volume V having a fifth position N5. Transition volume V is in fluid communication with outlet port 24 in fifth position N5. Transition volume V has a fifth pressure P5 and a fifth temperature T5 at fifth position N5.

According to the present invention, third pressure P3 is greater than second pressure P2, and the transition volume V at third position N3 contains cooled recirculation gas 46 plus inlet gas 22, thereby providing a cooler operating supercharger.

Figure 6:
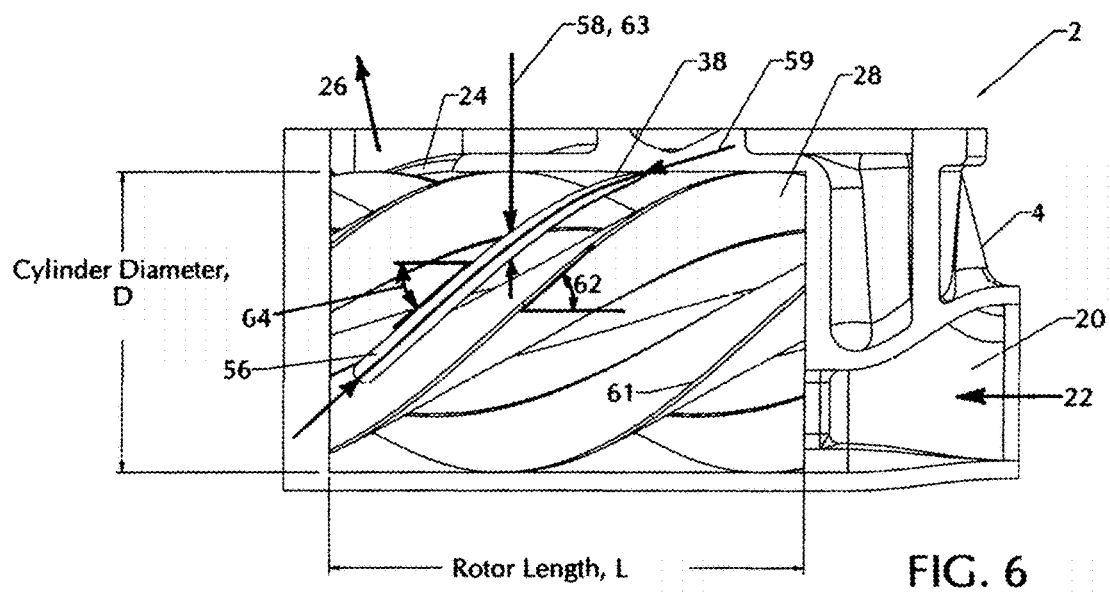
FIG. 6 is a side view of the supercharger shown in FIG. 4, and is a cut away view to show the recirculation port cross sectional area.

Referring now to FIGS. 3 and 6, supercharger 2 has a lobed rotor length L, a cylinder diameter D and a cylinder area 54. Cylinder area 54 is equal to the circumference of first cylinder chamber 6 (or second cylinder chamber 8) times rotor length L according to the following formula:

Cylinder area=$\pi DL$

Recirculation port 38 also has a recirculation port cross sectional area 56 on cylinder 6. Recirculation port cross sectional area 56 is the area of the cylinder wall through which recirculation port 38 passes through. Preferably, according to the present invention, the ratio of recirculation port cross sectional area 56 to cylinder area 54 is at least 0.010 and preferably greater than 0.015, thereby providing a large enough flow area for recirculation of cooled gas through recirculation port 36 into chamber 6.

Supercharger 2 further has a recirculation port angle 58 for the open duration of recirculation port 38 and a leading edge 61 of rotor tip 36. Recirculation port angle 58 is measured in rotational degrees of first lobed rotor 28 from leading edge 61 first passing into recirculation port 38, to lending edge 61 functionally passing out of recirculation port 38. Preferably, according to the present invention, recirculation port angle 58 is less than 18 degrees and preferably less than 16 degrees, for maximizing inlet port 20 cross sectional area. The larger recirculation port angle 58 is, the less space is available for inlet port 20 and outlet port 24. Accordingly, a small port angle 58 provides space for a larger and higher flow capacity inlet port 20.

The recirculation port cross sectional area 56 has a cord length 59 and an arc length 63. The recirculation port cord length 59 is the maximum length that can be drawn on the cylinder area 54 of a curve having a constant helix angle and lying entirely inside the recirculation port 38. Recirculation port angle 58 is measured in rotational degrees of first lobed rotor 28 from the time the leading edge 61 of rotor tip 36 first touches recirculation port 38 to the time the leading edge 61 of rotor tip 36 last touches recirculation port 38. The arc length 63 of recirculation port 38 is equal to the circumference of first cylindrical chamber 6 times recirculation port angle 58 divided by 360 degrees according to the following formula:

Arc length 63=$\pi D$(recirculation port angle 58)/360

According to the embodiment of the present invention shown in FIG. 6, rotary blower or supercharger 2 has an arc length 63 for recirculation port 38, and a cord length 59 for recirculation port 38, and the ratio of cord length 59 to arc length 63 is at least 7:1 and preferably greater than 9:1, thereby providing a large recirculation port cross sectional area 56 over a small recirculation port angle 58, thereby enabling the size of inlet port 20 to be maximized for maximizing the flow capacity of supercharger 2.

Preferably first lobed rotor 28 has a rotor helix angle 62, and recirculation port 38 has a recirculation port helix angle 64. Preferably recirculation port helix angle 64 is within 10 degrees of rotor helix angle 62 for maximizing inlet port cross sectional area.

Figure 7:
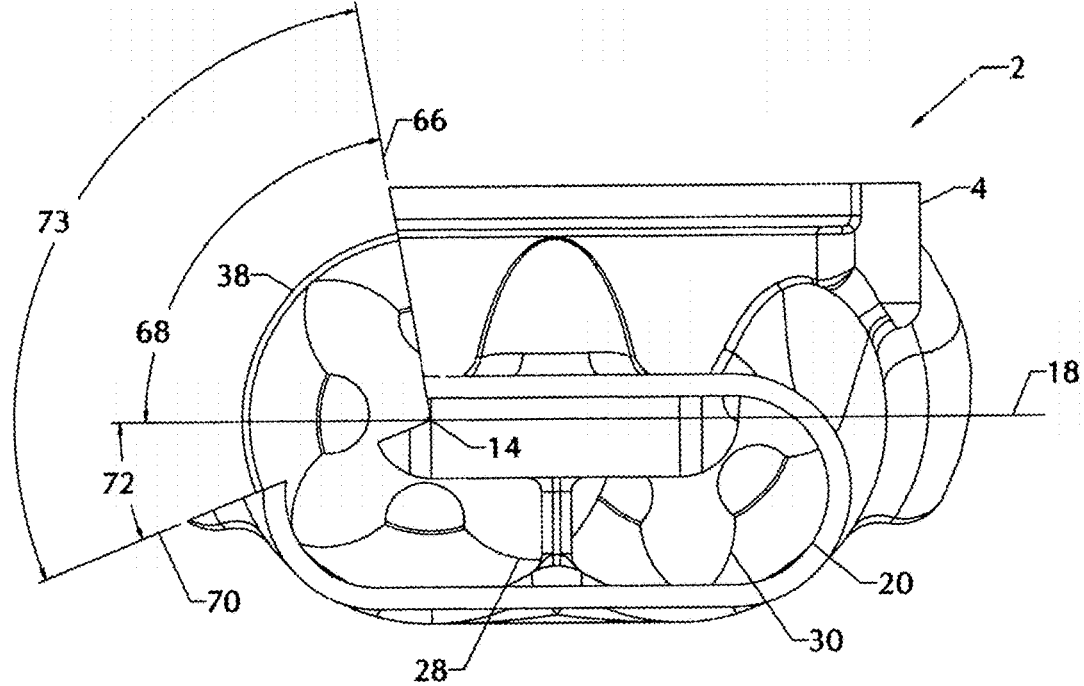
FIG. 7 is an end view of the supercharger shown in FIG. 4, and is a cut away view to show the recirculation port angles.

Referring now to FIGS. 6 and 7, recirculation port 38 has an inlet plane 66 passing through recirculation port 38 and first central axis 14, and an inlet angle 68 between inlet plane 66 and common plane 18. Recirculation port 38 further has an inlet cross sectional area 56 on cylinder 6. Preferably, according to the present invention, inlet angle 68 is greater than 50 degrees thereby providing a large inlet cross sectional area 56.

Again referring to FIGS. 6 and 7, recirculation port 38 has an outlet plane 70 passing through recirculation port 38 and first central axis 14, and an outlet angle 72 between outlet plane 70 and common plane 18, and a recirculation port angle 73 between inlet plane 66 and outlet plane 70. Recirculation port 38 further has an inlet cross sectional area 56 on cylinder 6. Preferably, according to the present invention, recirculation port angle 73 is at least 60 degrees, thereby providing a large inlet cross sectional area 56. Preferably recirculation port 38 extends below common plane 18 or to the opposite side of common plane 18 from outlet port 24 to provide a larger cross sectional area 56 while maintaining a small arc length 63. Preferably outlet angle 72 is at least 10 degrees.

Referring now to FIGS. 5, 6 and 7 recirculation port 38 is shown with a contiguous recirculation port cross sectional area 56. In some embodiments of the present invention port cross sectional area 56 may be interrupted by structural or aerodynamic fins or divided for other purposes so as to form a plurality of recirculation ducts 38. In embodiments of the present invention having a plurality of recirculation ports for first cylindrical chamber 6 (or for second cylindrical chamber 8) the recirculation port cross sectional area 56, the recirculation port angle 58, the recirculation port cord length 59, the inlet angle 68, the outlet angle 72, and the recirculation port angle 73 will refer to the combined dimensions of the plurality of recirculation ports 38.

Referring to FIG. 2, supercharger 2, further has a leading rotor lobe 50 and an adjacent trailing rotor lobe 52, and a rotor position N2 located at the moment the trailing lobe 52 has rotated out of fluid communication with inlet port 20. Preferably, according to the present invention, recirculation port 38 is functionally located downstream of leading rotor lobe 50 at rotor position N2, and in more detail, not between leading rotor lobe 50 and trailing rotor lobe 52, thereby preventing fluid communication of recirculation flow path 40 and inlet port 20. Downstream is intended to mean a location yet to be encountered by leading rotor lobe 50. Recirculation port 38 is functionally located downstream of leading rotor lobe 50 where minor openings of recirculation port 38 prior to full closure of inlet port 20 do not lessen the scope of the present invention.

Recirculation port 38 can be located on the sides or ends of chambers 6 and 8, or in end wall surfaces 10 and 12.

Leading rotor lobe 50 defines a leading lobe sealing perimeter 74 with internal wall surface 10 and end wall surfaces 12. Trailing rotor lobe 52 defines a trailing lobe sealing perimeter 76 with internal wall surface 10 and end wall surfaces 12. Second rotor position N2 is located at the moment the trailing lobe sealing perimeter 76 has rotated out of fluid communication with inlet port 20. Preferably, according to the present invention, recirculation port 38 is functionally located downstream of leading lobe sealing perimeter 74 at second rotor position N2 thereby preventing fluid communication of recirculation flow path 40 and inlet port 20. Downstream is intended to mean a location yet to be encountered by leading rotor lobe 50.

Supercharger 2 further has a fifth rotor position N5 located at the moment the leading lobe sealing perimeter 74 has rotated into direct fluid communication with outlet port 24. Trailing lobe sealing perimeter 76 is functionally located downstream of recirculation port 38 at fifth rotor position N5, thereby limiting direct fluid communication of outlet port 24 and recirculation port 38 through chamber 6 at fifth rotor position N5, for increasing the portion of outlet gas 26 flowing through recirculation flow path 40 into chamber 6, and primarily into the transition volume of third rotor position N3 at fifth rotor position N5.

Referring now to FIGS. 2, 3, 4 and 5, supercharger 2 further has an outlet cusp 78 (shown in FIG. 5). Outlet cusp 78 is located at the intersection of cylindrical chamber 6 and cylindrical chamber 8 where the two rotors mesh together. Supercharger 2 has a cusp rotor position N4$b$ located at the moment the leading lobe sealing perimeter 74 has rotated into of fluid communication with outlet cusp 78. Supercharger 2 has a transition volume V4$b$ between leading rotor lobe 50 and trailing rotor lobe 52 at rotor position N4$b$. Preferably, according to the present invention, recirculation port 38 is at least partially located between of leading lobe sealing perimeter 74 and trailing lobe sealing perimeter 76 at cusp rotor position N4$b$, so that outlet gas 26 at approximately pressure P5 will flow first through recirculation port 38 into transition volume V4$b$ at rotor position N4$b$, instead of back flowing into transition volume V4$b$ past outlet cusp 78, thereby increasing the portion of gas 26 flowing through recirculation flow path 40 and cooling means 42 into chamber 6. In more detail, at rotor position N4$b$ recirculation port 38 is in fluid communication with the transition volume, but the back flow blow hole past outlet cusp 78 is not generally or functionally in fluid communication with the transition volume.

In more detail, inlet gas 22 first flows through inlet port 20 into transition volume V at first position N1. First lobed rotor 28 continues to rotate clockwise to second position N2, where trailing rotor lobe 52 and trailing lobe sealing perimeter 76 functionally closes inlet port 20 off from the transition volume V at second position N2. Pressure P2 and temperature T2 are generally similar to pressure P1 and temperature T1, although there are some differences in the temperature and pressure values due to intake gas flow dynamics. First lobe 28 continues to rotate clockwise to third position N3, where leading rotor lobe 50 and leading lobe sealing perimeter 74 rotate into contact and then past recirculation port 38. FIG. 3 shows third position N3 for second lobed rotor 30. The same conditions occur for first lobed rotor 28. The conditions depicted for third position N3 and fifth position N5 apply equally to first lobed rotor as to second lobed rotor 30. Similarly, the conditions depicted for second position N2 and fourth position N4 apply equally to second lobed rotor 30 as to first lobed rotor 28. Cooled recirculation gas 46 rushes into the transition volume V at third position N3, because the cooled recirculation gas 46 has a high pressure and the transition volume initially has a low pressure value, and in more detail the transition volume has a low pressure before the cooled recirculation gas starts to flow into the transition volume between leading rotor lobe 50 and trailing rotor lobe 52. Cooled recirculation gas 46 has a pressure only slightly less than fifth pressure P5, and the transition volume has an initial pressure value that is largely the same as second pressure P2 before the cooled recirculation gas 46 flows into the transition volume. Supercharger 2 has a low operating temperature according to the present invention because transition volume V at third position N3 is filled with cooled recirculation gas 46. According to the present invention, transition volume V is largely prefilled with cooled recirculation gas 46, thereby largely preventing transition volume V from being filled with hot gas back flowing from outlet port 24. Cooled recirculation gas 46 is cooled in cooling means 42 before flowing through recirculation port 38 and into transition volume V, or more generally flowing back into first cylinder chamber 6. First lobed rotor 28 continues to rotate clockwise until leading rotor lobe 50 and leading lobe sealing perimeter 74 rotates past outlet cusp 78 at which time the transition volume opens indirectly to outlet port 24, and in more detail opens through a non-aerodynamic flow path around and between the helical rotor lobes and rotor housing inner wall surfaces 10. The indirect flow path is through first cylindrical chamber 6 and second cylindrical chamber 8, and around first lobed rotor 28 and second lobed rotor 30. This flow path is sometimes referred to as a blow hole for back flow of compressed air. According to an embodiment of present invention, recirculation port 38 has a relatively large opening cross sectional area 56 and preferably an aerodynamic flow path thereby providing greater flow through recirculation port 38 than through the blow hole during rotor positions where both the blow hole and recirculation port 38 are open at the same time. According to the preferred embodiment of the present invention, recirculation port 38 opens before leading rotor lobe 50 and leading lobe sealing perimeter 74 rotate past outlet cusp 78 so filling of transition volume V with cooled recirculation gas 46 will commence before the blow hole opens or opens large enough for substantive backflow. In practice, and according to an embodiment of the present invention, a small opening of the blow hole will not cause substantive back flow. First lobed rotor 28 continues to rotate clockwise to forth position N4 and then to fifth position N5. At fifth position N5 transition volume V opens directly to outlet port 24. At fifth position N5 according to the present invention there is no or almost no backflow of hot outlet gas 26 back into transition volume V because transition volume V has already been prefilled and largely pressurized with cooled recirculation gas 46.

Figure 8:
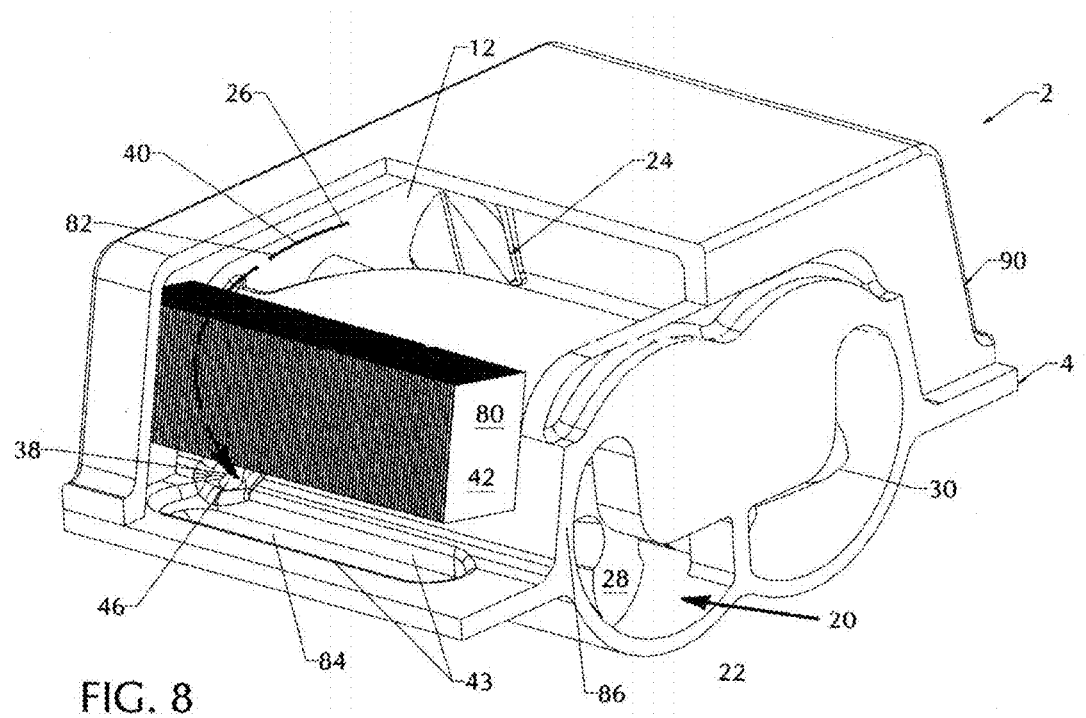
FIG. 8 is a cut away view intended to illustrate a supercharger having a close-coupled intercooler and recirculation duct according to the present invention.
Figure 9:
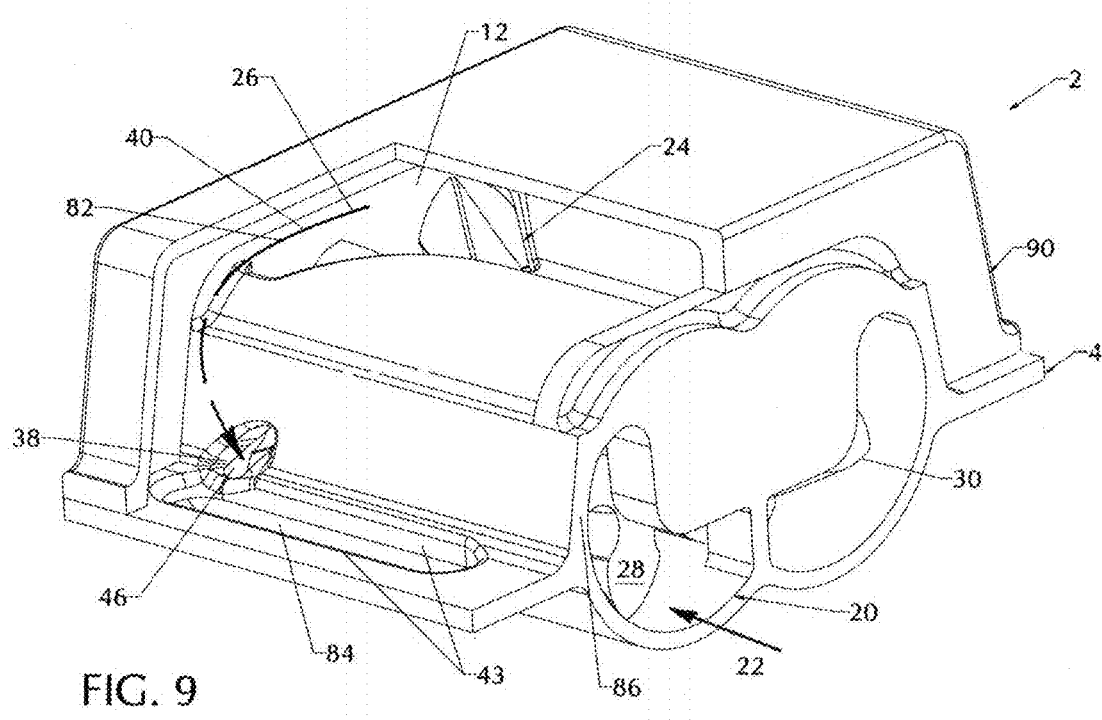
FIG. 9 is similar to FIG. 8 but with the intercooler removed to better shown the recirculation port.
Figure 10:
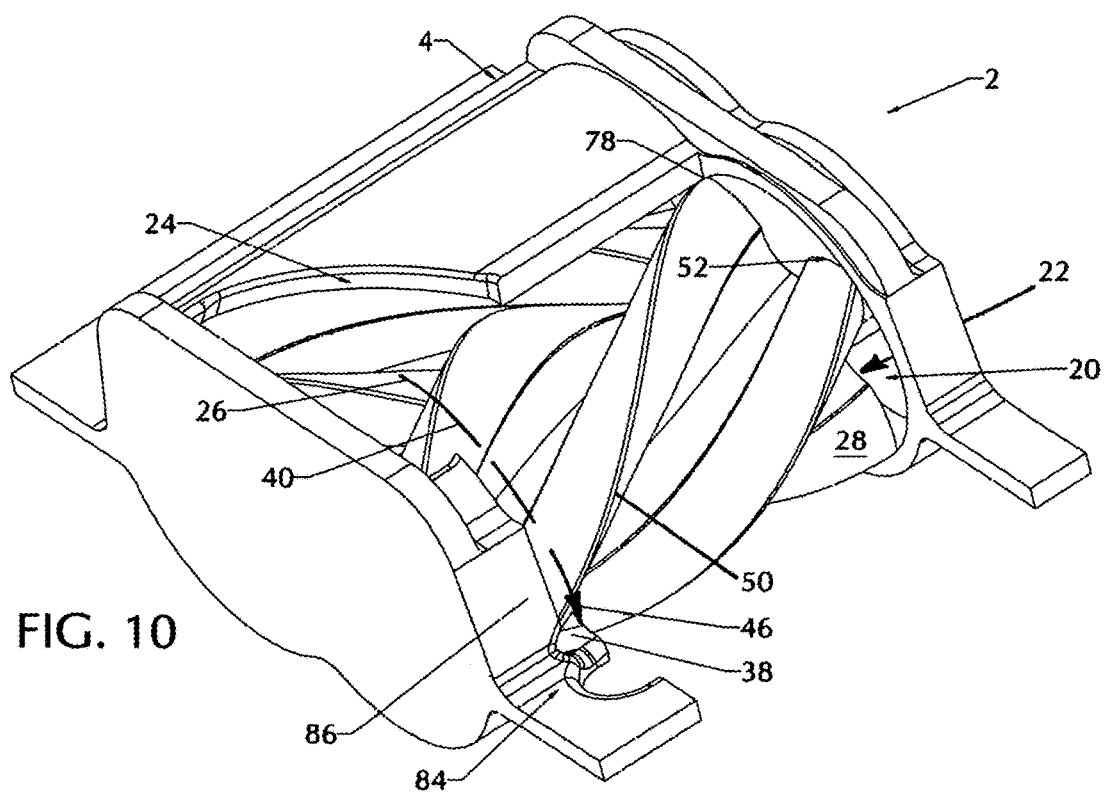
FIG. 10 shows another view of the supercharger of FIG. 9 and with the housing cut away to show the supercharger rotors and outlet cusp.

Referring now to FIGS. 8, 9 and 10 preferably the cooling means is a close-coupled intercooler 80 and recirculation flow path 40 has a recirculation flow path length 82 measured from first cylindrical chamber 6 through cooling means 42, and back into first cylindrical chamber 6. According to embodiments of the present invention having close-coupled intercoolers 80, recirculation flow path length 82 is less than 50 centimeters long, thereby providing a fast response supercharge with a minimized time lag for high boost pressures to be attained.

Preferably superchargers 2 having a close coupled intercooler 80, has an intercooler outlet plenum 84, where recirculation port 38 passes directly from intercooler outlet plenum 84 to first cylindrical chamber 6, thereby providing close coupled intercooling. Preferably intercooler outlet plenum 84 and first cylindrical chamber 6 have a shared a cast wall 86, where recirculation port 38 passes directly through shared cast wall 86. Some embodiments of the present invention may optionally have a smaller than ideal recirculation port cross sectional area in order to minimize cost or provide a more compact supercharger design.

Referring now to FIG. 2, supercharger 2 may optionally include a control valve 88 for control of cooled recirculation gas 46 through recirculation port 38 into chamber 8, thereby providing improved performance of supercharger 2 over a broad range of supercharger operational speeds. In engines using the present invention, control valve 88 is preferably controlled by the engine's engine control unit or ECU.

Figure 11:
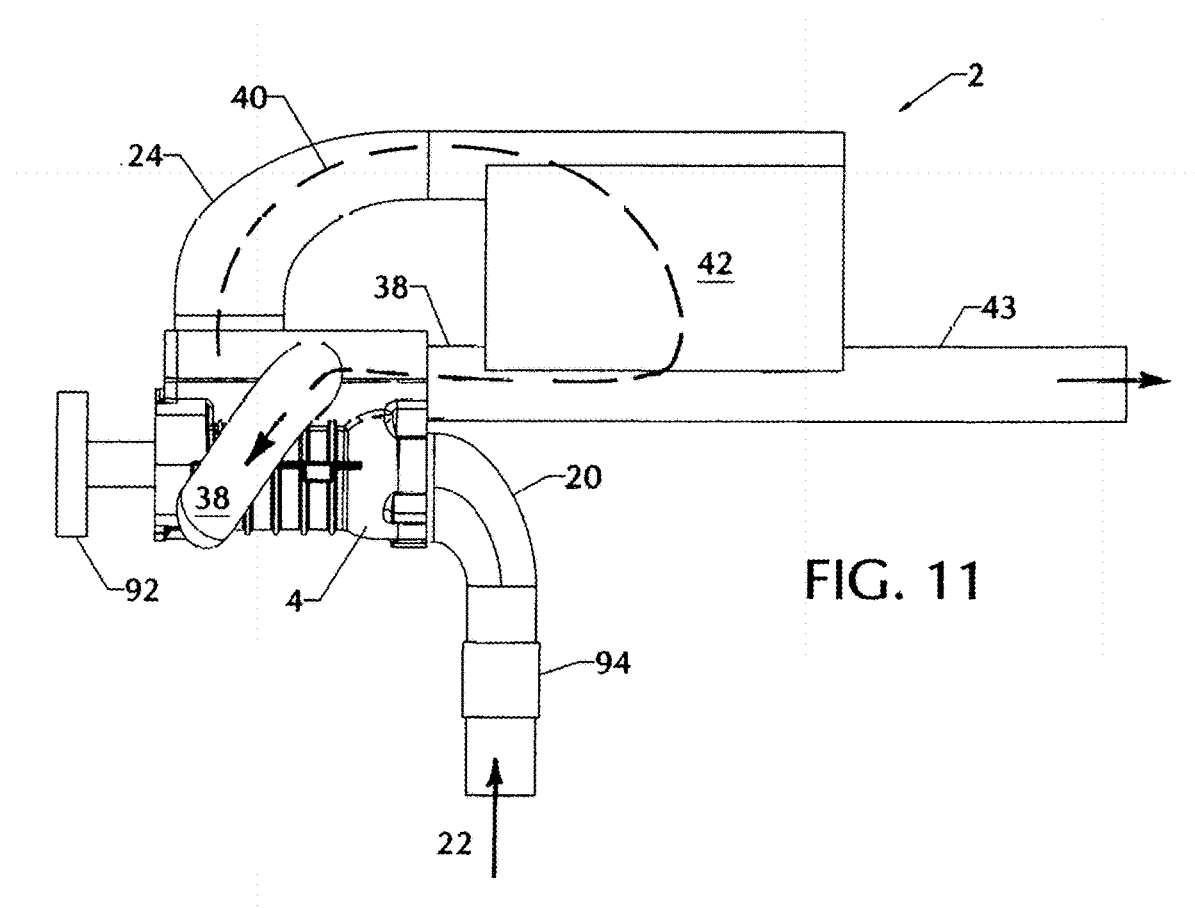
FIG. 11 is intended to schematically illustrate a side view of the present invention, and show cooling means according to the present invention.
Figure 12:
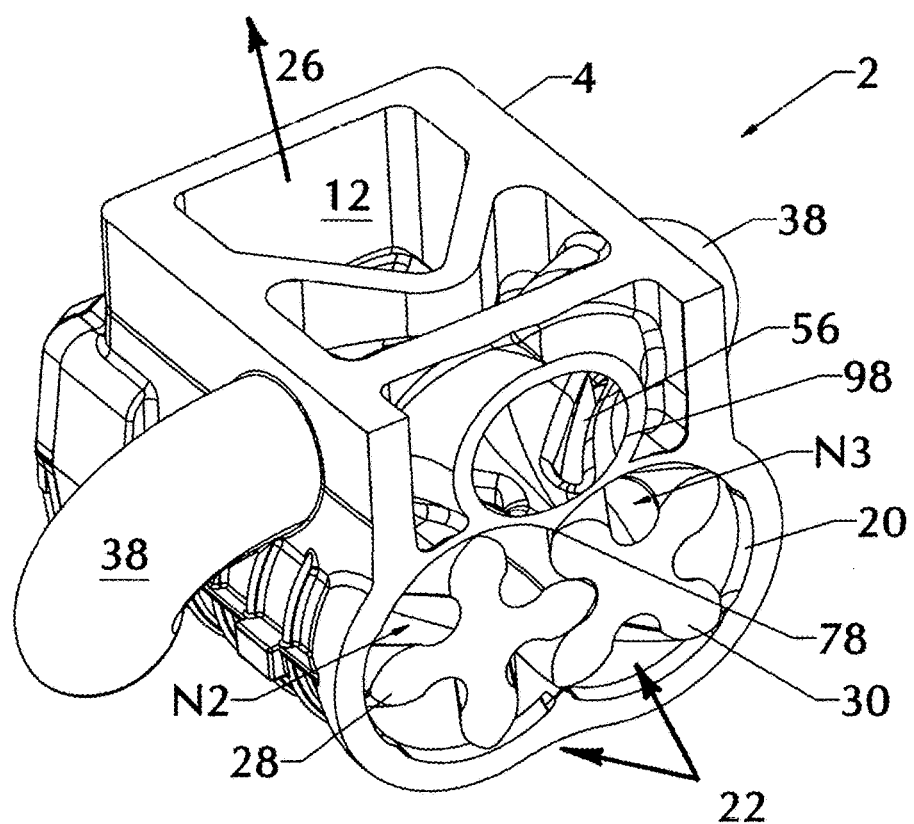
FIG. 12 is intended to illustrate in partial sectional view a portion of the rotary blower shown in FIG. 11.

FIG. 12 is intended to illustrate in partial sectional view a portion of the rotary blower shown in FIG. 11. FIG. 12 shows recirculation ports 38 having a common recirculation port inlet 98. Referring now to the embodiment shown in FIG. 4, recirculation ports 38 are spaced apart to provide a centralized flow path between outlet port 24 and a bypass port 96. The embodiment shown in FIG. 12 does not have the bypass arrangement shown in FIG. 4, and in the embodiment shown in FIG. 12 a first end of recirculation duct 38 is located much closer to outlet cusp 78 than in the embodiment shown in FIG. 4. Referring now to FIGS. 6, 7 and 12, in the embodiment shown in FIG. 12 an acceptably large recirculation port cross sectional area 56 may be attained with a recirculation port 38 that does not extend below common plane 18, provided outlet plane 70 is no more than 30 degrees above common plane 18. In more detail, according to an embodiment of the present invention, rotary blower 2 has an outlet cusp 78 and a recirculation port 38. Recirculation port 38 further has an outlet plane 70 passing through recirculation port 38 and first central axis 14, and an outlet angle 72 between outlet plane 70 and common plane 18. Outlet plane 70 is located between common plane 18 and outlet cusp 78. Recirculation port 38 further has an inlet cross sectional area 56 on cylinder 6. According to an embodiment of the present invention, outlet angle 72 is no more than 30 degrees above common plane 18, thereby providing a large inlet cross sectional area 56. Preferably, according to the present invention, recirculation port angle 73 is also at least 60 degrees, thereby providing a large inlet cross sectional area 56.

The invention claimed is:

1. A rotary blower (2) including a housing assembly (4) defining first (6) and second (8) transversely overlapping cylindrical chambers having internal cylindrical wall surfaces (10) and end wall surfaces (12), the first chamber (6) having a first central axis (14), and the second chamber (8) having a second central axis (16), said first central axis (14) and said second central axis (16) being spaced apart and parallel, and lying in a common plane (18), and the housing assembly (4) defining an inlet port (20) for the inflow of an inlet gas (22), and an outlet port (24) for the outflow of the outlet gas (26), and first (28) and second (30) meshed, lobed rotors respectively disposed in the first and second transversely overlapping cylindrical chambers (6 and 8) for counter rotation about axes substantially coincident with the first and second central axes (14) and (16), said first (28) and said second (30) meshed lobed rotors being rotatably mounted for rotation through rotational positions, said first (28) and said second (30) meshed lobed rotors having a sealing mesh fit (32) for generally limiting flow of gas between the first and second meshed lobed rotors, each rotor lobe (28 and 30) having axially facing ends (34) sealingly cooperating with the end wall surfaces (12) of said housing assembly (4), and each of the rotor lobes (28 and 30) having a plurality of radially outer tips (36) sealingly cooperating with the cylindrical wall surfaces (10), wherein said housing assembly (4) further includes a recirculation port (38) and a recirculation flow path (40) for recirculation of a portion of said outlet gas (26) flowing out of the outlet port (24) back into said first cylindrical chamber (6), said recirculation flow path (40) further including a cooler (42) for cooling of at least a portion of said gas (26), wherein said housing assembly (4) further includes a lobed rotor length (L), a cylinder diameter (D) and cylinder area (54), said cylinder area (54) being equal to the circumference of said first cylindrical chamber (6) times said lobed rotor length (L), $$\text{cylinder area}(54) = \pi DL$$

and the recirculation port (38) having a recirculation port cross sectional area (56) on said first cylindrical chamber (6), wherein the ratio of the recirculation port cross sectional area (56) to the cylinder area (54) is at least 0.010, thereby providing a large enough flow area for recirculation of cooled gas through said recirculation port (36) into said first cylindrical chamber (6).

2. A rotary blower (2) including a housing assembly (4) defining first (6) and second (8) transversely overlapping cylindrical chambers having internal cylindrical wall surfaces (10) and end wall surfaces (12), the first chamber (6) having a first central axis (14), and the second chamber (8) having a second central axis (16), said first central axis (14) and said second central axis (16) being spaced apart and parallel, and lying in a common plane (18), and the housing assembly (4) defining an inlet port (20) for the inflow of an inlet gas (22), and an outlet port (24) for the outflow of the outlet gas (26), and first (28) and second (30) meshed, lobed rotors respectively disposed in the first and second transversely overlapping cylindrical chambers (6 and 8) for counter rotation about axes substantially coincident with the first and second central axes (14) and (16), said first (28) and said second (30) meshed lobed rotors being rotatably mounted for rotation through rotational positions, said first (28) and said second (30) meshed lobed rotors having a sealing mesh fit (32) for generally limiting flow of gas between the first and second meshed lobed rotors, each rotor lobe (28 and 30) having axially facing ends (34) sealingly cooperating with the end wall surfaces (12) of said housing assembly (4), and each of the rotor lobes (28 and 30) having a plurality of radially outer tips (36) sealingly cooperating with the cylindrical wall surfaces (10), wherein said housing assembly (4) further includes a recirculation port (38) and a recirculation flow path (40) for recirculation of a portion of said outlet gas (26) flowing out of the outlet port (24) back into said first cylindrical chamber (6), said recirculation flow path (40) further including a cooler (42) for cooling of at least a portion of said gas (26), wherein said recirculation port (38) further has a recirculation port cross sectional area (56) having a port cord length (59) and an arc length (63), wherein the ratio of said port cord length (59) to said arc length (63) is at least 7:1, thereby providing a large recirculation port cross sectional area (56) over a small arc length (63), thereby enabling the size of said inlet port (20) to be maximized for maximizing the flow capacity of said rotary blower (2).

3. A rotary blower (2) including a housing assembly (4) defining first (6) and second (8) transversely overlapping cylindrical chambers having internal cylindrical wall surfaces (10) and end wall surfaces (12), the first chamber (6) having a first central axis (14), and the second chamber (8) having a second central axis (16), said first central axis (14) and said second central axis (16) being spaced apart and parallel, and lying in a common plane (18), and the housing assembly (4) defining an inlet port (20) for the inflow of an inlet gas (22), and an outlet port (24) for the outflow of the outlet gas (26), and first (28) and second (30) meshed, lobed rotors respectively disposed in the first and second transversely overlapping cylindrical chambers (6 and 8) for counter rotation about axes substantially coincident with the first and second central axes (14) and (16), said first (28) and said second (30) meshed lobed rotors being rotatably mounted for rotation through rotational positions, said first (28) and said second (30) meshed lobed rotors having a sealing mesh fit (32) for generally limiting flow of gas between the first and second meshed lobed rotors, each rotor lobe (28 and 30) having axially facing ends (34) sealingly cooperating with the end wall surfaces (12) of said housing assembly (4), and each of the rotor lobes (28 and 30) having a plurality of radially outer tips (36) sealingly cooperating with the cylindrical wall surfaces (10), wherein said housing assembly (4) further includes a recirculation port (38) and a recirculation flow path (40) for recirculation of a portion of said outlet gas (26) flowing out of the outlet port (24) back into said first cylindrical chamber (6), said recirculation flow path (40) further including a cooler (42) for cooling of at least a portion of said gas (26), wherein said first lobed rotor (28) has a rotor helix angle (62), said recirculation port (38) has a recirculation port helix angle (64), wherein said recirculation port helix angle (64) is within 10 degrees of said rotor helix angle (62), for maximizing flow through said recirculation port 38.

4. A rotary blower (2) including a housing assembly (4) defining first (6) and second (8) transversely overlapping cylindrical chambers having internal cylindrical wall surfaces (10) and end wall surfaces (12), the first chamber (6) having a first central axis (14), and the second chamber (8) having a second central axis (16), said first central axis (14) and said second central axis (16) being spaced apart and parallel, and lying in a common plane (18), and the housing assembly (4) defining an inlet port (20) for the inflow of an inlet gas (22), and an outlet port (24) for the outflow of the outlet gas (26), and first (28) and second (30) meshed, lobed rotors respectively disposed in the first and second transversely overlapping cylindrical chambers (6 and 8) for counter rotation about axes substantially coincident with the first and second central axes (14) and (16), said first (28) and said second (30) meshed lobed rotors being rotatably mounted for rotation through rotational positions, said first (28) and said second (30) meshed lobed rotors having a sealing mesh fit (32) for generally limiting flow of gas between the first and second meshed lobed rotors, each rotor lobe (28 and 30) having axially facing ends (34) sealingly cooperating with the end wall surfaces (12) of said housing assembly (4), and each of the rotor lobes (28 and 30) having a plurality of radially outer tips (36) sealingly cooperating with the cylindrical wall surfaces (10), wherein said housing assembly (4) further includes a recirculation port (38) and a recirculation flow path (40) for recirculation of a portion of said outlet gas (26) flowing out of the outlet port (24) back into said first cylindrical chamber (6), said recirculation flow path (40) further including a cooler (42) for cooling of at least a portion of said gas (26), wherein said recirculation port (38) has an inlet plane (66) passing through said recirculation port (38) and said first central axis (14), and an inlet angle (68) between said inlet plane (66) and said common plane (18), said recirculation port (38) further having an inlet cross sectional area (56) on said first cylindrical chamber (6), and said recirculation port (38) has an outlet plane (70) passing through said recirculation port (38) and said first central axis (14), and an outlet angle (72) between outlet plane (70) and said common plane (18), and a recirculation port angle (73) between said inlet plane (66) and said outlet plane (70), said recirculation port (38) further having an inlet cross sectional area (56) on said first cylindrical chamber (6), wherein said recirculation port angle (73) is at least 60 degrees, thereby providing a large inlet cross sectional area (56), said recirculation port angle (73) being measured about said first central axis (14) and between said first inlet plane (66) and said outlet plane (70).

5. The rotary blower of claim 4, wherein said outlet angle (72) is no more than 30 degrees thereby providing a large inlet cross sectional area for recirculation port (38).

* * * * *